United States Patent
Schmit et al.

(10) Patent No.: US 8,435,326 B2
(45) Date of Patent: May 7, 2013

(54) MULTI-STAGE PROCESS FOR REMOVING $CO_2$ RELATIVE TO HYDROGEN FROM SYNGAS STREAMS

(75) Inventors: Steven J. Schmit, Elk River, MN (US); Jacqueline Hichingham, Anoka, MN (US); Duane A. Goetsch, Andover, MN (US); Lloyd R. White, Minneapolis, MN (US); Ulrich Bonne, Kallua-Kona, HI (US)

(73) Assignee: G.D.O., Elk River, MN (US)

( * ) Notice: Subject to any disclaimer, the term of this patent is extended or adjusted under 35 U.S.C. 154(b) by 290 days.

(21) Appl. No.: 13/007,865

(22) Filed: Jan. 17, 2011

(65) Prior Publication Data

US 2011/0203455 A1    Aug. 25, 2011

Related U.S. Application Data

(60) Provisional application No. 61/295,348, filed on Jan. 15, 2010.

(51) Int. Cl.
*B01D 53/22* (2006.01)

(52) U.S. Cl.
USPC ............ 95/51; 95/43; 95/45; 96/4; 96/7; 96/11

(58) Field of Classification Search ............. 95/43, 45, 95/51; 96/4, 7, 11
See application file for complete search history.

(56) References Cited

U.S. PATENT DOCUMENTS

| | | | | |
|---|---|---|---|---|
| 4,524,581 A | * | 6/1985 | Cascone et al. | 60/781 |
| 4,863,492 A | * | 9/1989 | Doshi et al. | 95/8 |
| 4,946,477 A | * | 8/1990 | Perka et al. | 48/197 R |
| 6,043,288 A | * | 3/2000 | DeGeorge et al. | 518/715 |
| 6,114,400 A | * | 9/2000 | Nataraj et al. | 518/715 |
| 6,153,163 A | * | 11/2000 | Prasad et al. | 423/246 |
| 7,011,694 B1 | * | 3/2006 | Ho | 95/51 |
| 7,118,612 B2 | * | 10/2006 | Shreiber et al. | 95/54 |
| 7,351,275 B2 | * | 4/2008 | Dunn | 95/51 |
| 8,016,923 B2 | * | 9/2011 | Baker et al. | 96/4 |
| 2002/0155061 A1 | * | 10/2002 | Prasad et al. | 423/652 |
| 2005/0235650 A1 | * | 10/2005 | Griffin et al. | 60/780 |
| 2009/0239959 A1 | * | 9/2009 | Wallace et al. | 518/700 |
| 2011/0030384 A1 | * | 2/2011 | Ku et al. | 60/780 |

\* cited by examiner

*Primary Examiner* — Jason M Greene
*Assistant Examiner* — Anthony Shumate
(74) *Attorney, Agent, or Firm* — Henry E. Naylor

(57) ABSTRACT

A multi-stage membrane process for the removal of carbon dioxide from syngas streams containing at least about 5 volume percent carbon dioxide. The syngas is preferably obtained by the gasification of a biomass feedstock.

16 Claims, 4 Drawing Sheets

MULTI-STAGE PROCESS FOR REMOVING $CO_2$ RELATIVE TO HYDROGEN FROM SYNGAS STREAMS

CROSS-REFERENCE TO RELATED APPLICATIONS

This application is based on U.S. Provisional Application No. 61/295,348 filed Jan. 15, 2010.

FIELD OF THE INVENTION

The present invention relates to a multi-stage membrane process for the removal of carbon dioxide from syngas streams containing at least about 5 volume percent carbon dioxide. The syngas is preferably obtained from the gasification of a biomass feedstock.

BACKGROUND OF THE INVENTION

A substantial amount of research and development is being done to reduce our dependency on petroleum-based energy and to move us toward more sustainable energy sources, such as wind energy, solar energy, and biomass. Of these three sustainable energy sources, biomass is receiving the most attention. One reason for this is that biomass is widely available in a variety of forms. Also, the economy of agricultural regions growing crops can greatly benefit from plants that convert biomass to transportation fuels. Thus, governmental bodies in agricultural regions are supportive of proposed biomass plants. In order to convert biomass to high value products, such as transportation fuels, it typically must first be converted to a synthesis gas (syngas) by gasification. Biomass gasification is a well-known process for producing syngas, which is a gas mixture containing varying amounts of carbon monoxide and hydrogen as the major components.

Syngas leaving the gasifier must be cooled and cleaned before it is suitable as feedstock for chemical synthesis. It contains various constituents that can foul downstream equipment, damage compressors and poison catalysts used in downstream processes. Solids entrained in the syngas are typically fines that are generated from the attrition of solids circulating in the gasifier, ash generated from the biomass, and soot. Furthermore, syngas derived from biomass generally contain relatively large amounts of $CO_2$ compared to syngas derived from natural gas or coal. This is a consequence of the low heating value of biomass as well as the process conditions needed to produce a syngas having the desired $H_2$ to CO ratio for downstream processing, such as for the production of higher value liquid products. The overall yield of desired liquid product from syngas can be increased by removing as much of the $CO_2$ as possible. Large amounts of $CO_2$ in the syngas make conventional acid gas removal technologies, such as, caustic scrubbing, economically infeasible. Other commercially available technologies based on physical absorption to remove $CO_2$ from syngas streams are also not economically feasible. For example, the use of methanol and amine scrubbing (MEA, MDEA) are not particularly suitable for the removal of $CO_2$ from syngas generated from biomass because they are energy intensive requiring large refrigeration loads and reboiler duties, respectively.

While commercial processes presently exist for removing $CO_2$ from gaseous mixtures, they are typically not economically suitable for removing relatively high levels of $CO_2$ from syngas streams. Therefore, there is a need in the art for a more cost effective technology capable of removing $CO_2$ from syngas streams containing at least 5 vol. % $CO_2$.

SUMMARY OF THE INVENTION

In accordance with the present invention there is provided a process for removing $CO_2$ from a syngas stream containing from about 5 to 50 volume percent $CO_2$, which process comprises:

i) conducting said syngas stream to a first $CO_2$ separation zone wherein a first permeation membrane is used having a separation factor of $CO_2$ to $H_2$ of at least about 5 to 1, to separate a first retentate stream from a first permeate stream, wherein said first permeate stream is comprised predominantly of $CO_2$ with smaller amounts of $H_2$, CO and other contaminants of the syngas, and wherein said first retentate stream is comprised primarily of the syngas stream but containing a substantially lower level of $CO_2$;

ii) collecting said first retentate stream;

iii) conducting said first permeate stream to a compression zone wherein its pressure is elevated to an effective pressure for the next downstream $CO_2$ separation zone;

iv) conducting said elevated pressure permeate stream from said compression zone to a second $CO_2$ separation zone wherein a second permeation membrane, having a separation factor of $CO_2$ to $H_2$ of at least 5 to 1, is used to result in a second retentate stream and a second permeate stream, wherein at least a portion of said second retentate stream is recycled to said first $CO_2$ separation zone and wherein said second permeate, which is comprised substantially of $CO_2$ is collected, or vented to the atmosphere.

In a preferred embodiment, a portion of said second retentate stream is conducted to a hydrogen separation zone.

In another preferred embodiment, condensed water is removed from the elevated pressure permeate stream exiting said compression zone.

In still another preferred embodiment, said second retentate stream is passed to a compression zone before being recycled to said first $CO_2$ separation zone.

In another preferred embodiment, said compression zone has two or more compression stages wherein each stage is at a higher pressure than the previous stage.

DETAILED DESCRIPTION OF THE INVENTION

Figure 1:
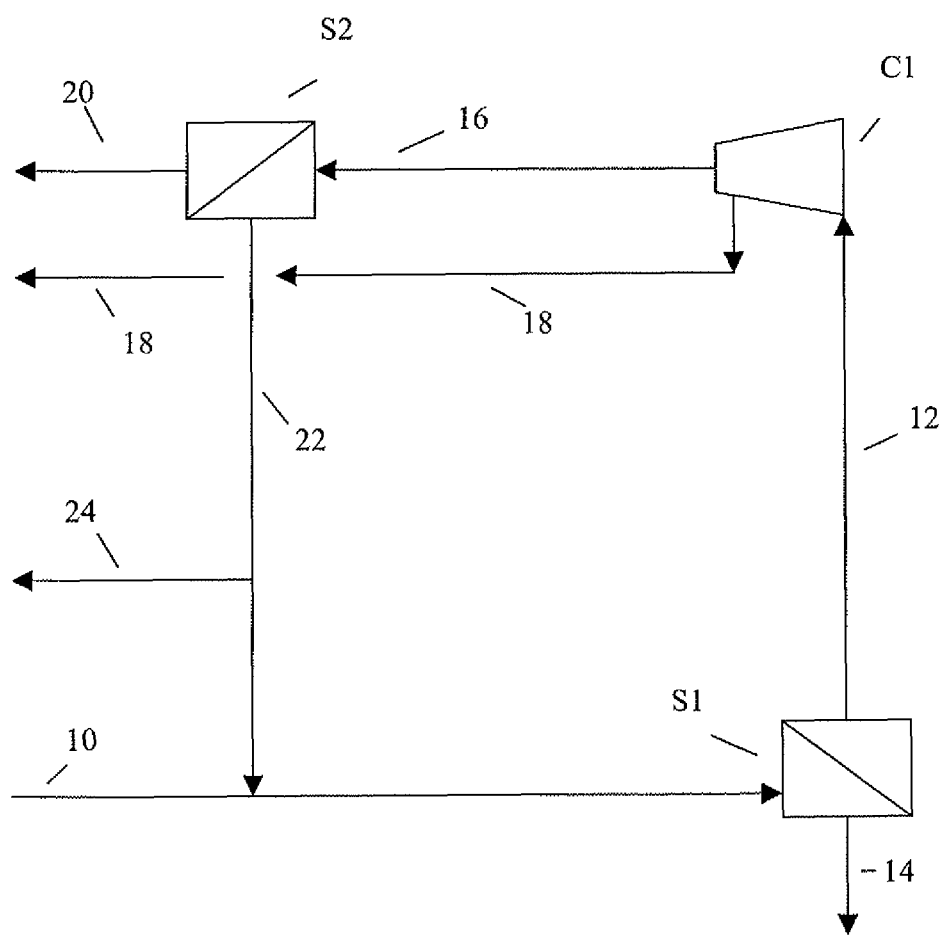
FIG. 1 hereof is a flow diagram of a preferred process of the present invention showing one compression zone and two $CO_2$ separation zones.

The syngas treated in accordance with the present invention is syngas containing relatively high levels of $CO_2$. By relatively high levels of $CO_2$ we mean containing at least about 5 volume percent, preferably from about 5 to 50 volume percent, more preferably from about 5 to 20 volume percent $CO_2$. Syngas streams containing such high levels of $CO_2$ are typically obtained from the gasification of a biomass. The term "biomass" as used herein, is intended to refer to any non-fossilized, i.e., renewable organic matter collected for use as a source of energy. Non-limiting examples of types of biomass that can be used in the practice of the present invention include plant biomass (defined below), animal biomass (any animal by-product, animal waste, etc.) and municipal waste biomass (residential and light commercial refuse with recyclables, such as metal and glass removed). The term "plant biomass" or "lignocellulosic biomass" as used herein is intended to refer to virtually any plant-derived organic matter (woody and non-woody) available for energy on a sustainable basis. Plant biomass can include, but is not limited to: agricultural crops, such as corn; agricultural crop wastes and residues, such as corn stover, corn cobs, wheat straw, rice straw, rice hulls, kennaf, distiller's grains, sugarcane bagasse, sugar beet tailings or waste, and the like. Plant biomass further includes cellulosic based materials such as: woody energy crops; wood wastes, such as old railroad ties; residues from trees, such as softwood forest thinnings, barky wastes; sawdust, paper and pulp industry waste streams, wood fiber, and the like. Additionally, grass crops such as switch grass and the like have the potential to be produced in large-scale as another plant biomass source. For urban areas, a potential plant biomass feedstock comprises yard waste (e.g., grass clippings, leaves, tree clippings, brush, etc.) and vegetable processing waste. It is preferred that the biomass used in the practice of the present invention be a lignocellulosic biomass.

Any suitable gasifier can be used to generate the syngas from a biomass feedstock. Non-limiting examples of types of gasifiers suitable for use herein include counter-current fixed bed (up draft) gasifiers, co-current fixed bed (down draft) gasifiers, entrained flow gasifiers, and fluidized bed gasifiers. Fluidized bed gasifiers are preferred.

The syngas leaving a gasifier will typically be at temperatures up to about 1480° C., more typically at about 820° C. and will have to be cooled to a temperature lower than about 250° C., preferably from about 50° C. to about 200° C., more preferably from about 50° C. to about 150° C., and most preferably from about 50° C. to about 65° C. The syngas stream will preferably be cooled by passing it through a heat recovery steam generator or boiler where the syngas stream is rapidly quenched to the above mentioned temperatures and where high pressure steam is produced for the gasifier, as well as for other areas of the plant.

The cooled syngas stream will preferably be sent to a cleanup step wherein solids, such as fines and soot, are removed and where minor gas contaminants are also removed. A venturi scrubber can typically be used to knock-out fines and soot. Venturi scrubbers are well known in the art and they are typically comprised of three sections: a converging section, a throat section, and a diverging section. The inlet gas stream enters the converging section and, as the area decreases, gas velocity increases. Liquid is introduced either at the throat or at the entrance of the converging section. The inlet gas, forced to move at extremely high velocities in the small throat section, shears the liquid from its walls, producing an enormous number of tiny droplets. Particles and gas removal occur at the throat section as the inlet gas stream mixes with the fog of tiny liquid droplets. While venturis can be used to remove both particulate and gaseous pollutants, they are generally more effective in removing particles than gaseous pollutants. The syngas undergoes final cooling by preferably contacting it with a counter-current flow of water. This also scrubs out at least a portion of the minor gas contaminants. Because the water resulting from contacting the cooled gaseous stream and the venturi water are low in pH, $H_2S$ and $CO_2$ are not appreciably removed. As previously mentioned, syngas compositions derived from biomass contain relatively large amounts of $CO_2$ compared to syngas derived from natural gas or coal. It is desirable, and it is a goal of the present invention, to remove as much of this $CO_2$ as possible.

$CO_2$ is removed from the syngas by use of a multi-stage, preferably a two-stage, membrane system. Membranes suitable for use in the practice of the present invention are those that are capable of providing a separation factor of $CO_2$ to $H_2$ of at least about 5 to 1, preferably at least about 7 to 1, and more preferably at least about 10 to 1. This separation factor is not based on the permeation of pure gases, $CO_2$ and $H_2$, but on permeation of those gases from the syngas mixture. Measurements of permeation of pure gases through membranes are unreliable as predictors of separation factors that are obtained from gaseous mixtures. Such membranes are preferred because they have a greater affinity for $CO_2$ to adsorb on certain nano-porous media, such as zeolites and silica. This greater affinity facilitates, and even boosts, its own permeation through such media, while hindering or blocking all other gaseous species. There are several advantages of using such membranes. First, such a membrane system is energy efficient. While reducing the $CO_2$ concentration at least approximately 5-fold, the retentate process stream will retain about 65 to 70 vol. % $H_2$. Second, such a membrane will yield a relatively high concentration (>85%) $CO_2$ in the permeate. Third, such membranes allow for the adjustment of the desired retentate $CO_2$ and $H_2/CO$ levels via adjustments in such things as feed flow, pressure and temperature.

While membranes suitable for use in the practice of the present invention can be of both the so-call Type I and Type-II membranes, the Type II membranes will be preferred and they are generally relatively thin supported nano- and micro-porous materials. Such micro-porous membranes will preferably contain a connected network of about 0.6 nm pores in which small molecules can propagate by diffusion. Process conditions will be chosen such that the membrane becomes >50% saturated with $CO_2$ at the high pressure side. This leads to a very high selectivity for $CO_2$ relative to any other gas molecule, particularly $H_2$. Preferred membrane materials include amorphous silica for operation at temperatures less than about 400° C., micro-porous γ-alumina for operations less than about 200° C., and pore-modified zeolite-Y for operations less than about 100° C.

Figure 2:
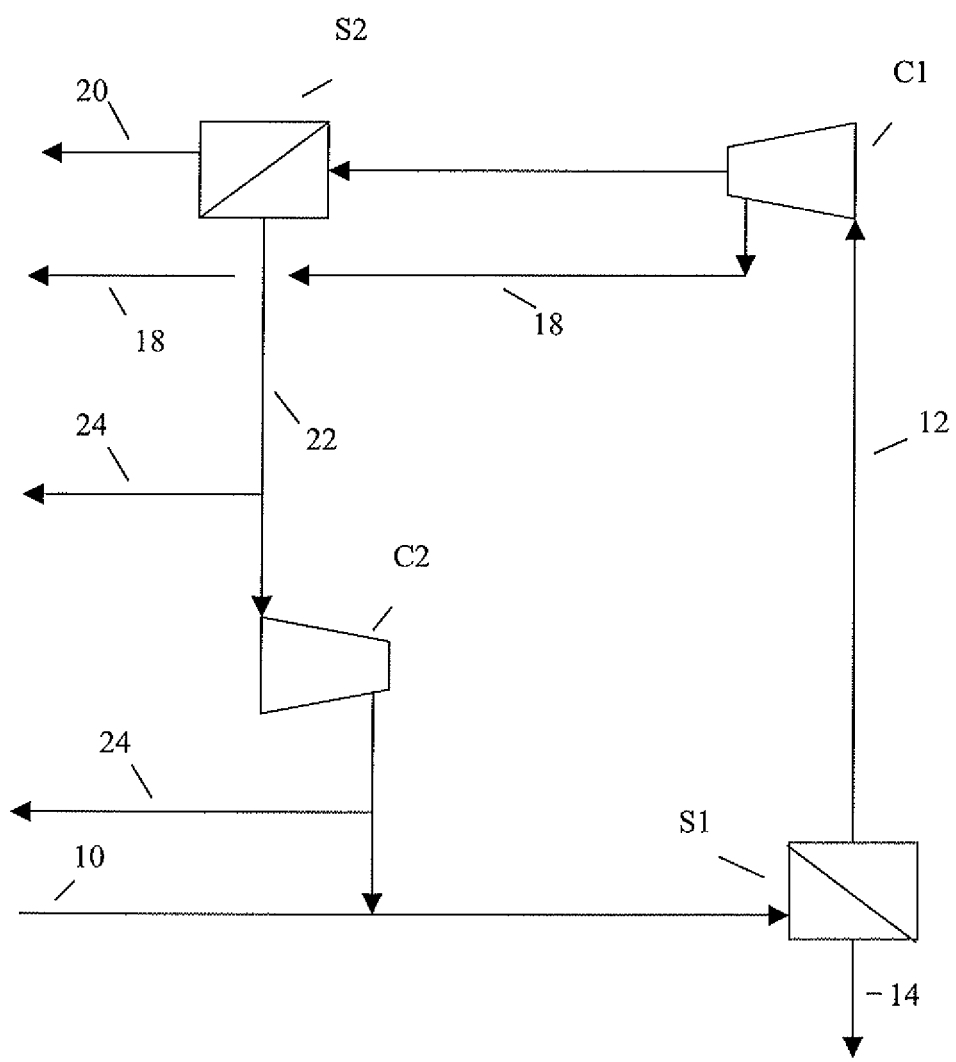
FIG. 2 hereof is a flow diagram of a preferred process of the present invention showing two compression zones and two $CO_2$ separation zones.

The present invention can better be understood with reference to the FIGS. 1 and 2 hereof. In FIG. 1 hereof, a syngas stream, preferably after cooling and being subjected to a clean-up step, is passed via line 10 to first stage $CO_2$ separation zone S1. The degree of cleanup will be determined by the composition of the particular membrane used in each separation zone. For example, all membranes suitable for use in the practice of the present invention cannot tolerate solids, fines, soot or tar that is found in many syngas streams, particularly those originating from a biomass gasifier. Such contaminants will have a tendency to plug the membrane. Such solid contaminants can be removed by any suitable conventional technology including the use of cyclones, ventoris, or bag houses. After solids removal, preferably only gases will remain, a minor portion of which will be contaminants such as HCN, HCl, $H_2S$, COS and $NH_3$ with a major portion being comprised of CO, $CO_2$ and $H_2$. Any suitable gas separation technology can be used to remove at least a portion of the minor amounts of contaminant gases. Non-limiting syngas cleanup technologies that can be used to remove these contaminant gases include water scrubbing, methanol adsorption, the use of a zinc oxide bed, and various processes for removing $H_2S$, like the LO-CAT process which uses liquid phase redox technology.

Returning now to FIG. 1 hereof, the cleaned syngas stream is conducted to first $CO_2$ separation zone S1 where it is passed through an active membrane of the present invention wherein at least a portion of the $CO_2$ will be separated from the stream. As previously mentioned, the membranes suitable for use in the practice of the present invention are those having a separation factor of $CO_2$ to $H_2$ of at least about 5 to 1, preferably at least about 7 to 1, and more preferably at least about 10 to 1. This separation factor is not based on the permeation of pure gases, $CO_2$ and $H_2$, but on permeation of those gases from the syngas mixture.

Figure 3:
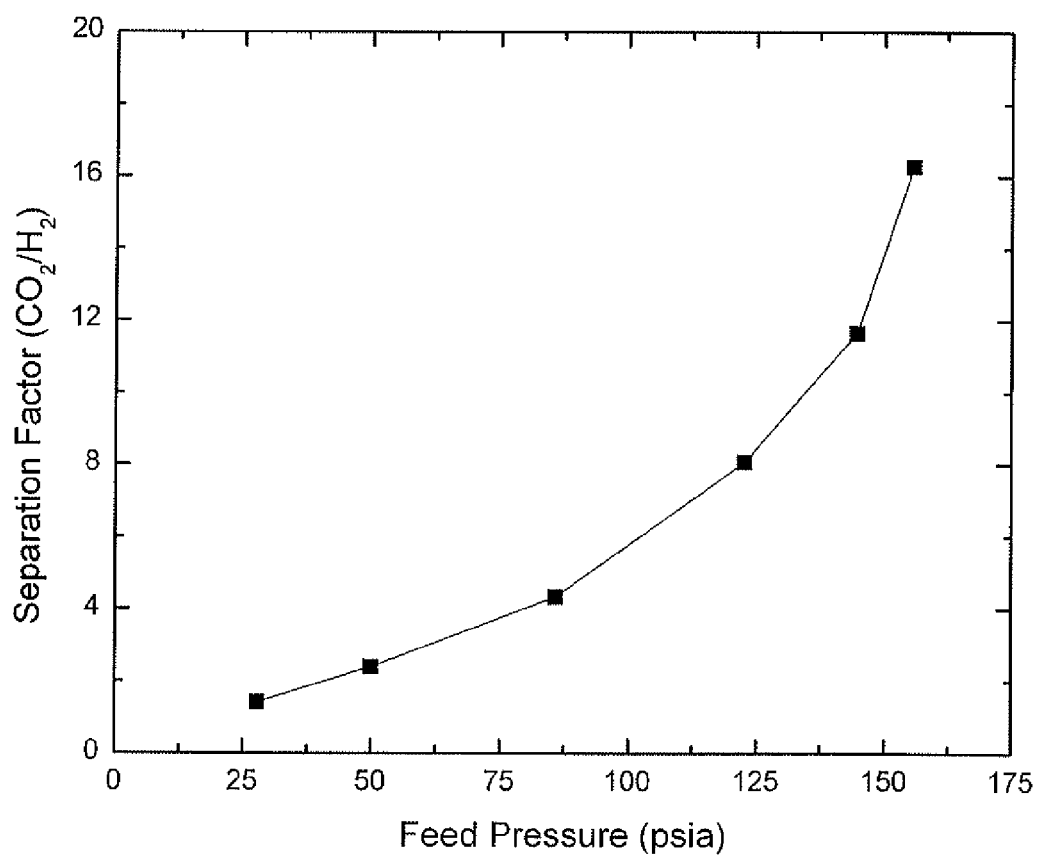
FIG. 3 hereof shows plots of the separation factor for $CO_2/H_2$ as a function of the feed pressure of the gas to a permeation membrane of the present invention. This plot shows that the separation factor increases non-linearly as the feed pressure of the gas increases. This plot is based on model data prepared from experimental data for an alumina-silicate membrane at 50° C.

In the case where the syngas steam is taken directly from a gasifier, the pressure of the syngas stream exiting the gasifier will be dependent on the particular gasifier employed. For example, some gasifiers are low pressure gasifiers whereas others are medium to high pressure gasifiers. If the syngas stream is at too low a pressure it will have to pass through a compression zone to increase its pressure to at least the operating pressure of the membrane used in separation zone S1. This pressure from about 20 psig to about 1000 psig, preferably from about 50 psig to about 700 psig, and most preferably from about 100 to about 400 psig. The goal of the $CO_2$ separation steps is to cost effectively remove as much of the $CO_2$ from the syngas stream as possible. FIG. 3 hereof shows that the separation factor increases with increasing feed pressure. As a result, higher feed pressures will result in larger separation factors and fluxes.

Figure 4:
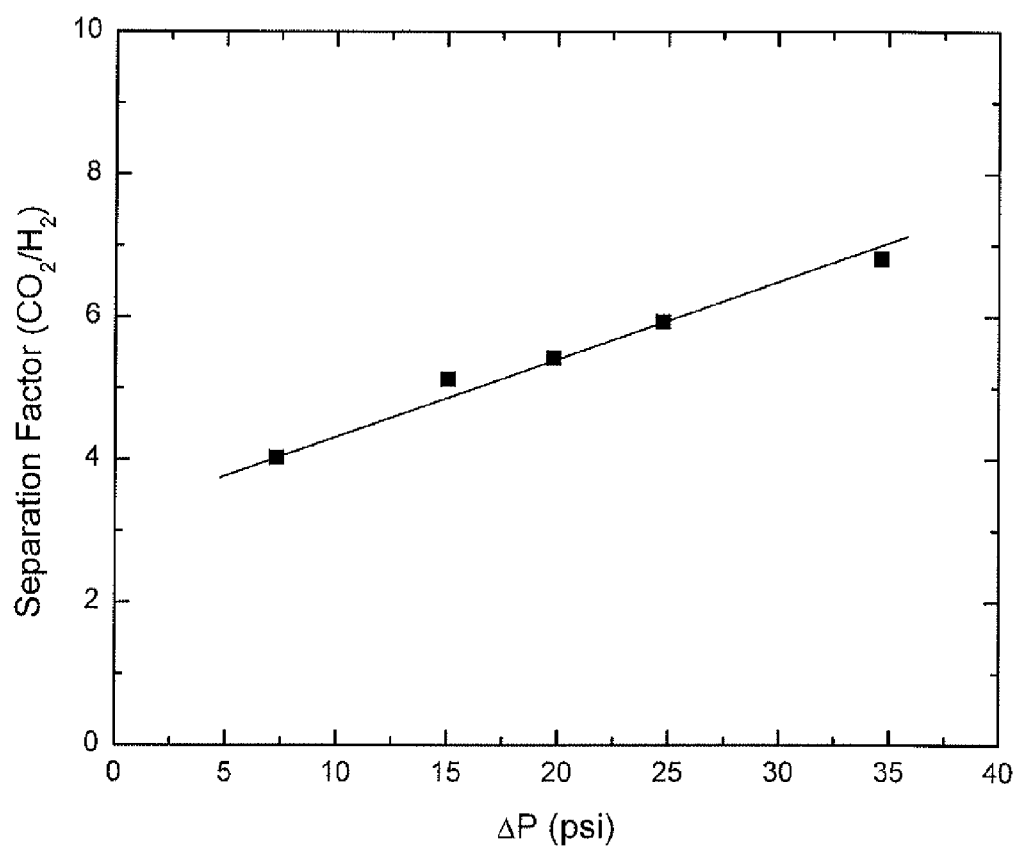
FIG. 4 hereof shows plots of the separation factor for $CO_2/H_2$ as a function of the differential pressure across a membrane of the present invention. The separation factor increases linearly as the differential pressure across the membrane increases. This plot is based on experimental data for an alumina-silicate membrane at 50° C.

The resulting retentate stream 14, comprised of the syngas stream having substantially lower levels of $CO_2$, can be passed to temporary storage or to downstream processing equipment. The resulting permeate stream 12, from separation zone S1, which now has a relatively high concentration of $CO_2$, and which has experienced a pressure drop by passing through the membrane of separation zone S1, is passed to compression zone C1 where its' pressure is increased to at least the operating pressure of the membrane of separation zone S2 and up to the inlet pressure of syngas stream 10 when the retentate stream from separation zone S2 is to be recycled to first separation zone S1. The pressure ranges are as indicated previously. It will be understood that the pressure of this permeate stream can be increased in either one compression stage or in two or more compression stages in series depending on the level of pressure increase needed. One reason compression is required is because the data shown in FIG. 4 shows that the separation factor increases with increased pressure drop across the membrane. At least a portion of any water that condenses in compression zone C1, as well as both C1 and C2 of FIG. 2 hereof, can be drawn-off, as shown via line 18. One preferred method for removing the water from the compressed stream from any compression zone is to use a knock-out drum, which is well known in the art. The compressed first permeate stream is conducted via line 16 to second $CO_2$ separation zone S2 wherein at least a portion, typically at least about 70 vol. %, preferably at least about 80 vol. %, more preferably at least about 90 vol. %, and most typically at least about 99 vol. % of the remaining $CO_2$ is removed and which forms a second permeate stream that can be conducted via line 20 to a $CO_2$ management zone (not shown) or which can be vented to the atmosphere.

The resulting second retentate stream 22 from second separation zone S2 will be comprised primarily of CO and $H_2$ with minor amounts of $CO_2$ and other contaminants as previously discussed. Second retentate stream 22 can be recycled to incoming syngas stream 10. A portion, up to about 50 vol. %, preferably from about 5 to about 50 vol %, more preferably from about 10 to 50 vol. %, and most preferably from about 20 to 50 vol. % of $CO/H_2$ steam 22 cam be directed via line 24 to a hydrogen separation zone wherein hydrogen is recovered from the stream. It is preferred that pressure swing adsorption be used to separate hydrogen from the stream. Pressure swing adsorption for the removal of hydrogen from gaseous streams is well known in the art, and includes both pressure swing adsorption as well as temperature swing adsorption.

FIG. 2 hereof shows a process scheme similar to that of FIG. 1 hereof, except retentate stream 22 is at too low a pressure to feed it into syngas stream 10. Therefore, it is passed to compression zone C2 wherein its pressure is raised to the pressure of inlet syngas stream 10. As previously mentioned, all compression zones used in the practice of the present invention can be operated in more than one stage, preferably in two or more stages in order to step the pressure of the stream up to its' desired end pressure. It will be noted that stream 24, which is comprised of a portion of the second retentate can be sent to a hydrogen separation zone before, after, or a portion before and a portion after compression zone C2.

What is claimed is:

1. A process for removing $CO_2$ from a syngas feedstream containing from about 5 to 50 volume percent $CO_2$, which process comprises:
   i) conducting said syngas stream, at a pressure of about 20 psig to about 1000 psig, to a first $CO_2$ separation zone wherein a first permeation membrane is used having a separation factor of $CO_2$ to $H_2$ of at least about 5 to 1, to separate a first retentate stream from a first permeate stream, wherein said first permeate stream is comprised predominantly of $CO_2$ with smaller amounts of $H_2$, CO and other contaminants of the syngas, and wherein said first retentate stream is comprised primarily of the syngas stream but containing a substantially lower level of $CO_2$;
   ii) collecting said first retentate stream;
   iii) conducting said first permeate stream to a compression zone wherein its pressure is elevated to an effective pressure for the next downstream $CO_2$ separation zone;
   iv) conducting said elevated pressure permeate stream from said compression zone to a second $CO_2$ separation zone wherein a second permeation membrane is used to result in a second retentate stream and a second permeate stream, wherein at least a portion of said second retentate stream is recycled to said first $CO_2$ separation zone and wherein said second permeate, which is comprised substantially of $CO_2$ is collected or vented to the atmosphere.

2. The process of claim 1 wherein the pressure of the syngas feedstream is from about 50 psig to about 700 psig.

3. The process of claim 1 wherein the temperature of the syngas feedstream is from about 50° to about 250° C.

4. The process of claim 3 wherein the temperature of the syngas feedstream is from about 50° to about 200° C.

5. The process of claim 1 wherein the volume percent of $CO_2$ in the syngas feedstream is from about 5 to 20.

6. The process of claim 1 wherein the syngas feedstream is derived from the gasification of a biomass.

7. The process of claim 1 wherein the syngas feedstream is first subjected to a particulate cleanup step wherein substantially all particulate matter is removed.

8. The process of claim 1 wherein the syngas feedstream, before it is conducted to said first $CO_2$ separation zone is subjected to a gas separation step wherein at least a portion of the gaseous contaminants selected from the group consisting of HCN, HCl, $H_2S$, COS and $NH_3$ are removed.

9. The process of claim 1 wherein the separation factor of $CO_2$ to $H_2$ is at least about 5 to 1.

10. The process of claim 1 wherein there are two or more compression stages, each raising the first permeate stream to a higher pressure than the previous compression stage.

11. The process of claim 1 wherein water is removed from said compression zone.

12. The process of claim 1 wherein at least a portion of said second retentate stream is sent to a hydrogen separation zone wherein at least a portion of the hydrogen is removed.

13. The process of claim 12 wherein the hydrogen separation zone includes a pressure swing adsorption device for removing hydrogen.

14. The process of claim 1 wherein said second retentate stream is conducted to a second compression zone wherein it's pressure is increased to the pressure of the syngas feedstream and which second retentate stream, now at a higher pressure, is recycled to said first $CO_2$ separation zone.

15. The process of claim 14 wherein at least a portion of said second retentate steam is sent to a hydrogen separation zone either before the retentate stream is compressed in said second compression zone, after said second compression zone, or a portion before and a portion after said second compression zone.

16. The process of claim 14 wherein said second compression zone is operated in at least two compression stages each at a higher pressure than the previous stage.

\* \* \* \* \*